April 5, 1966  D. S. WEISS  3,244,435
VEHICLE DRAWBAR STRUCTURE
Filed Aug. 19, 1963
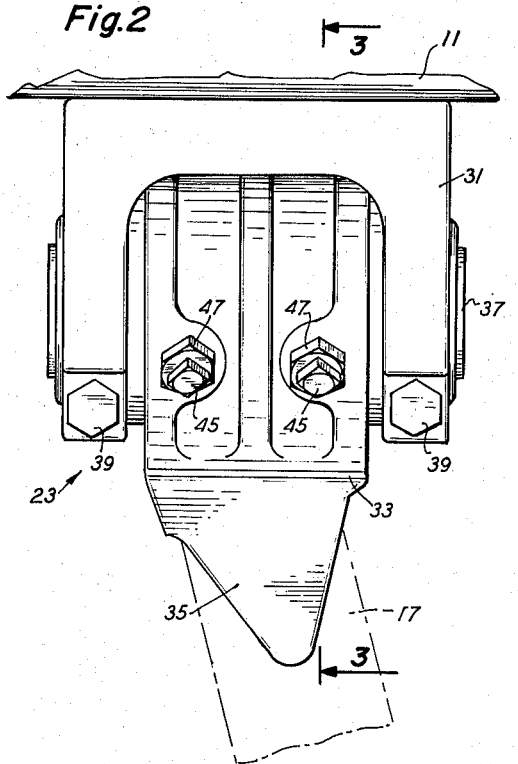
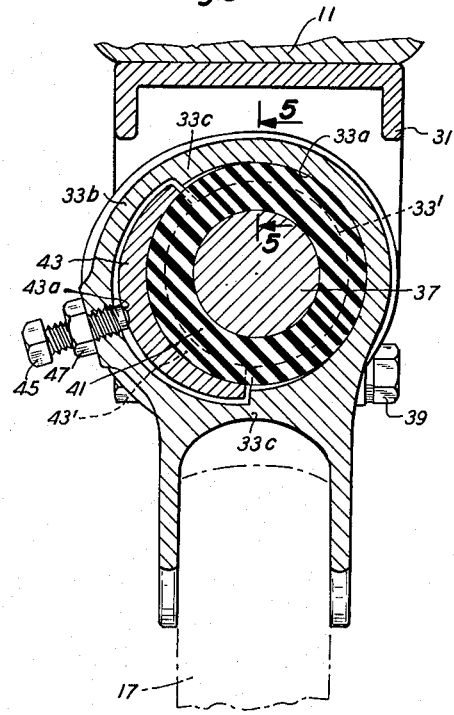
INVENTOR.
DEWEY S. WEISS
BY
BUCKHORN, BLORE, KLARQUIST & SPARKMAN
ATTORNEYS United States Patent Office 3,244,435
Patented Apr. 5, 1966

3,244,435
VEHICLE DRAWBAR STRUCTURE
Dewey S. Weiss, 3506 SE. Bybee Blvd.,
Portland, Oreg.
Filed Aug. 19, 1963, Ser. No. 302,921
8 Claims. (Cl. 280—485)

This invention relates to a drawbar structure and particularly one in which an elastomer shock absorbing member is incorporated in the drawbar structure.

In prior drawbar structures of the above type, such as disclosed in my own Patent 2,428,950, a nut has been employed to draw a tapered pin farther into an interiorly tapered elastomer sleeve to effect the desired anti-play compressive fit between the sleeve and related parts. It is frequently necessary to relieve the compression on said sleeve to enable the tongue of the drawbar structure to be raised to an out-of-the-way inoperative position. For instance, such a disposition of the tongue is required in order to move a trailer onto a truck bed for transporting the trailer back empty. To relieve the compression in my prior construction, the nut was loosened to allow retracting axial movement of the tapered pin. Occasionally, when the tongue was subsequently lowered to its operative position, the driver failed to tighten the nut. This allowed the nut to work itself off the pin, and the pin to work itself out of the sleeve, to allow a separation of the drawbar structure with resultant damage to the trailer.

It is a main object of the present invention to provide a drawbar structure of the general type under construction, in which the compression on the elastomer sleeve can be decreased to allow ready movement of the tongue, without any danger or likelihood of separation of the drawbar structure.

A more specific object of the invention is to provide a drawbar structure as above described in which the fit of the elastomer sleeve with the related parts is adjusted by a radially movable shoe.

Various other objects of the invention will be apparent from the following description taken in connection with the accompanying drawings wherein:

FIG. 1 is a somewhat diagrammatic view showing a drawbar structure of the present invention connecting a towing vehicle to a towed vehicle;

FIG. 2 is an enlarged plan view of a hinge structure of the drawbar structure;

FIG. 3 is a vertical section taken along line 3—3 of FIG. 2;

FIG. 4 is a side elevation view of the hinge structure taken in the direction of the arrows 4—4 in FIG. 2; and FIG. 5 is a fragmentary vertical section taken along line 5—5 of FIG. 3.

Referring to FIG. 1, a towed vehicle 11 is connected by a drawbar structure 13 to a towing vehicle 15. The drawbar structure incorporates the concepts of the present invention and includes a tongue in the form of a pair of rearwardly diverging legs 17 carrying an eye 19 at the front end thereof for engagement with a pintle or prong 21 on the towing vehicle. At the rear end of each of the legs 17 is a hinge structure or assembly generally entitled 23. Since the hinge structures are of identical construction, a description of only the left-hand structure will be given.

Referring to FIGS. 2, 3 and 4, the hinge structure or assembly includes a clevis-like bracket 31 for mounting on the towed vehicle 11. In accordance with usual practice, the bracket is welded to the forward end of the towed vehicle. The hinge structure further includes an annular housing member or eye 33 which has a pair of spaced lugs 35 for embracing the rear end of the legs 17. The lugs 35 are welded to the associated leg 17 in any of several desired positions, as indicated in FIG. 1.

It is apparent from FIG. 2 that the eye 33 is narrower than the recess between the legs of the clevis-like bracket member 31 so that it is spaced from each leg. Passing through the bracket 31 and the eye 33 is a cylindrical pin 37. The legs 31a of the bracket are split, as shown in FIG. 4, so that a nut and bolt unit 39 can be employed on each leg to clamp the pin 37 securely in place and to the bracket 31. A pair of tubular elastomer sleeves 41 are disposed between the eye 33 and the pin 37. The sleeves are separated from each other by an arcuate rib 33′ (FIGS. 3 and 4) formed interiorly on the eye 33. The rib 33′ maintains the eye 33 in spaced axial relation with respect to the legs of the bracket 31. Each sleeve has an interior diameter slightly larger than the exterior diameter of the pin 37, to have a sliding fit thereon. Each sleeve has a cylindrical exterior configuration which has a sliding fit within the bore of the eye 33. The bore of the eye, which is given the reference numeral 33a, is of cylindrical configuration except that the bore is recessed at 33b to accommodate a shoe 43 of arcuate configuration. The recessing at 33b provides stop surfaces 33c next to the circumferential ends of the shoe 43 so that the shoe is prevented from circumferential movement. The shoe has an arcuate rib 43′ forming a continuation of rib 33′. Rib 43′ prevents shifting movement of the shoe in a direction parallel to the axis of the pin 37.

Threaded into the eye 33 are a pair of adjustment bolts 45 which have their inner ends bearing in recesses 43a formed in the shoe 43. Jam nuts 47 are provided on the adjustment bolts to hold them in desired positions of adjustment.

In operation, the bolts 45 are threaded inwardly to achieve a desired compressive fit of the sleeve 41 between the eye 33 and the pin 37. A compressive fit is desired in order to avoid loose play in the drawbar structure. Despite the compressive fit, the drawbar structure does have a shock absorbing ability which is desirable. The compressive fit of the sleeve between the pin 37 and the eye 33 does, however, prevent the tongue 17 from being readily swung upwardly to an inoperative position, or at least if the tongue can be so moved, there might be a residual force tending to flip the tongue downwardly again.

To allow the tongue to be so freely moved, the jam nuts 47 can be loosened and the bolts 45 also loosened to relieve the pressure on the shoe 43 and thus relieve the pressure on the sleeve 41. Now, it is very easy to swing the tongue to any desired position. Despite the fact that the pressure has been relieved upon the shoe 43, there is still a solid connection of the drawbar structure and no danger whatsoever of the drawbar structure becoming separated because even if the bolts 45 work their way out of the eye 33, the only result will be the presence of play in the drawbar structure.

Having described the invention in what is considered to be the preferred embodiment thereof, it is desired that it be understood that the invention is not to be limited other than by the provisions of the following claims.

I claim:

1. A drawbar structure for connecting a towing vehicle to a towed vehicle, comprising a tongue having at one end at least one hinge assembly for mounting on the towed vehicle and having at its opposite end means for detachable connection to the towing vehicle, said hinge assembly including a clevis-like bracket for mounting on the towed vehicle, an eye on said tongue, said eye comprising an integral unbroken annular element, a pin extending through said eye and bracket and secured to the latter, a tubular elastomer sleeve disposed between said pin and said eye, and means separate from said eye for varying the contact pressure between the sleeve on one hand and the eye and pin on the other to attain varying resistance forces to the pivoting of the tongue about the axis of said pin.

2. A drawbar structure for connecting a towing vehicle to a towed vehicle, comprising a tongue having at one end at least one hinge assembly for mounting on the towed vehicle and having at its opposite end means for detachable connection to the towing vehicle, said hinge assembly including a clevis-like bracket for mounting on the towed vehicle, an eye on said tongue, said eye being of ring shape, a pin extending through said eye and bracket and secured to the latter, tubular elastomer sleeve means disposed between said pins and said eye, a shoe between said sleeve means and eye, said shoe being a member separate from said eye, and means for moving said shoe toward said pin to vary the contact pressure between said sleeve means and said eye and pin to attain varying resistance forces to the pivoting of the tongue about the axis of said pin.

3. A drawbar structure for connecting a towing vehicle to a towed vehicle, comprising a tongue having at one end at least one hinge assembly for mounting on the towed vehicle and having at its opposite end means for detachable connection to the towing vehicle, said hinge assembly including a clevis-like bracket for mounting on the towed vehicle, an eye on said tongue, said eye being a continuous uninterrupted annular member, a pin extending through said eye and bracket and retained by the latter, tubular elastomer sleeve means disposed between said pin and said eye, a shoe between said sleeve means and eye, means for moving said shoe toward said pin to vary the contact pressure between said sleeve means and said eye and pin to attain varying resistance forces to the pivoting of the tongue about the axis of said pin, and stop means for preventing circumferential movement of said shoe relative to said eye.

4. A drawbar structure for connecting a towing vehicle to a towed vehicle, comprising a tongue having at one end at least one hinge assembly for mounting on the towed vehicle and having at its opposite end means for detachable connection to the towing vehicle, said hinge assembly including a clevis-like bracket for mounting on the towed vehicle, an eye on said tongue, a cylindrical pin extending through said eye and bracket and secured to the latter, a tubular elastomer sleeve disposed between said pin and said eye, a shoe between said sleeve and said eye, said sleeve having a cylindrical interior surface slidably receiving said pin and a cylindrical exterior surface, said eye having a cylindrical interior surface to slidably receive said sleeve, said cylindrical interior surface of said eye being recessed to accommodate said shoe and provide stop surfaces at the circumferential ends of said shoe to prevent circumferential movement of said shoe relative to said eye, and screw means on said eye engaging said shoe and operable when actuated one way to force said shoe inwardly or when actuated the opposite way to allow said shoe to move outwardly.

5. A drawbar structure for connecting a towing vehicle to a towed vehicle, comprising a tongue having at one end at least one hinge assembly for mounting on the towed vehicle and having at its opposite end means for detachable connection to the towing vehicle, said hinge assembly including a clevis-like bracket for mounting on the towed vehicle, an eye on said tongue, a cylindrical pin extending through said eye and bracket, said bracket having split portions with means for tightening the same around said pin to prevent movement of said pin relative to said bracket, a tubular elastomer sleeve disposed between said pin and said eye, a shoe between said sleeve and said eye, said sleeve having a cylindrical interior surface slidably receiving said pin and a cylindrical exterior surface, said eye having a cylindrical interior surface to slidably receive said sleeve, said cylindrical interior surface of said eye being recessed to accommodate said shoe and provide stop surfaces at the circumferential ends of said shoe to prevent circumferential movement of said shoe relative to said eye, and screw means on said eye engaging said shoe and operable when actuated one way to force said shoe inwardly or when actuated the opposite way to allow said shoe to move outwardly.

6. A drawbar structure for connecting a towing vehicle to a towed vehicle, comprising a tongue having at one end at least one hinge assembly for mounting on the towed vehicle and having at its opposite end means for detachable connection to the towing vehicle, said hinge assembly including a clevis-like bracket for mounting on the towed vehicle, an eye on said tongue, said eye being of ring shape, a pin extending through said eye and bracket and retained by the latter, a tubular elastomer sleeve disposed between said pin and said eye, and means for varying the contact pressure between the sleeve on one hand and the eye and pin on the other to attain varying resistance forces to the pivoting of the tongue about the axis of said pin, said eye having a pair of tongue members receiving lug portions for embracing an elongate tongue member and adapted to accommodate several angular positions of said tongue member relative to said pin.

7. A hinge assembly for a drawbar structure adapted for connecting a towing vehicle to a towed vehicle, wherein said drawbar structure includes a tongue, said hinge assembly including a clevis-like bracket for mounting on the towed vehicle, an eye on said tongue, said eye comprising an integral endless one-piece annular member, a pin extending through said eye and bracket and retained by the latter, a tubular elastomer sleeve disposed between said pin and said eye, and means carried by said eye but otherwise independent thereof for varying the contact pressure between the sleeve on one hand and the eye and pin on the other to attain varying resistance forces to the pivoting of the tongue about the axis of said pin, 8. A hinge assembly for a drawbar structure adapted for connecting a towing vehicle to a towed vehicle, wherein said drawbar structure includes a tongue, said hinge assembly including a clevis-like bracket for mounting on the towed vehicle,
an eye on said tongue,
a cylindrical pin extending through said eye and bracket,
said bracket having split portions with means for tightening the same around said pin to prevent movement of said pin relative to said bracket,
a tubular elastomer sleeve disposed between said pin and said eye,
a shoe between said sleeve and said eye, said sleeve having a cylindrical interior surface slidably receiving said pin and a cylindrical exterior surface,
said eye having a cylindrical interior surface to slidably receive said sleeve,
said cylindrical interior surface of said eye being recessed to accommodate said shoe and provide stop surfaces at the circumferential ends of said shoe to prevent circumferential movement of said shoe relative to said eye,
and screw means on said eye engaging said shoe and operable when actuated one way to force said shoe inwardly or when actuated the opposite way to allow said shoe to move outwardly.

References Cited by the Examiner
UNITED STATES PATENTS

| | | | |
|---|---|---|---|
| 1,749,335 | 3/1930 | Geyer. | |
| 2,428,950 | 10/1947 | Weiss | 280—485 |
| 2,467,530 | 4/1949 | Johnson | 280—485 |
| 2,856,216 | 10/1958 | Witzel | 287—87 |
| 2,996,313 | 8/1961 | Harbors et al. | 280—485 |

LEO FRIAGLIA, *Primary Examiner.*